United States Patent
Lupini et al.

(10) Patent No.: US 6,619,009 B2
(45) Date of Patent: Sep. 16, 2003

(54) REINFORCEMENT FOR EXPANDABLE COMPOSITIONS AND METHODS FOR USING THE REINFORCEMENT

(75) Inventors: Michael Allen Lupini, Milford, MI (US); David Franey, Wyandotte, MI (US)

(73) Assignee: Orbseal LLC, Richmond, MO (US)

(*) Notice: Subject to any disclaimer, the term of this patent is extended or adjusted under 35 U.S.C. 154(b) by 0 days.

(21) Appl. No.: 10/136,663

(22) Filed: Apr. 30, 2002

(65) Prior Publication Data

US 2002/0164450 A1 Nov. 7, 2002

Related U.S. Application Data

(60) Provisional application No. 60/287,647, filed on Apr. 30, 2001.

(51) Int. Cl.[7] ............................................. E04B 2/00
(52) U.S. Cl. ...................... 52/732.2; 52/732.1; 52/373
(58) Field of Search .......................... 52/649.1, 309.7, 52/373, 732.1, 732.2, 732.6; 428/68; 425/383

(56) References Cited

U.S. PATENT DOCUMENTS

| | | | |
|---|---|---|---|
| 4,052,347 | A | 10/1977 | Dieterich et al. |
| 4,355,138 | A | 10/1982 | Markusch et al. |
| 4,427,481 | A | 1/1984 | Smith et al. |
| 4,855,490 | A | 8/1989 | Markusch et al. |
| 4,864,025 | A | 9/1989 | Robin et al. |
| 4,874,650 | A | * 10/1989 | Kitoh et al. ............... 428/68 |
| 4,888,442 | A | 12/1989 | Dunlap et al. |
| 4,904,522 | A | 2/1990 | Markusch |
| 4,910,332 | A | 3/1990 | Kahl et al. |
| 5,106,415 | A | 4/1992 | Davidian |
| 5,266,133 | A | 11/1993 | Hanley et al. |
| 5,356,943 | A | 10/1994 | Dueber et al. |
| 5,373,027 | A | 12/1994 | Hanley et al. |
| 5,461,091 | A | 10/1995 | Hoffmann et al. |
| 5,506,025 | A | 4/1996 | Otto et al. |

(List continued on next page.)

FOREIGN PATENT DOCUMENTS

| | | |
|---|---|---|
| DE | 3838655 A1 | 11/1988 |
| EP | 0393903 | 10/1990 |
| EP | 0453777 | 10/1991 |
| EP | 0581191 B1 | 2/1994 |
| EP | 0730998 | 9/1996 |
| WO | WO 96/06124 | 2/1996 |
| WO | WO 98/52997 | 11/1998 |
| WO | WO 01/24989 A1 | 4/2001 |

OTHER PUBLICATIONS

PCT International Search Report or the Declaration.

SAE Technical Paper Series 2001–01–0313—Development of a Technique to Strengthen Body Frame with Structural Foam—Kyoso Ishida, Mitsugi Fukahori, Katsuhori Kanakawa, Hideaki Tanaka and Kenji Matsuda—Mazda Motor Corp.

*Primary Examiner*—Carl D. Friedman
*Assistant Examiner*—Nahid Amiri
(74) *Attorney, Agent, or Firm*—Michael K. Boyer

(57) ABSTRACT

A reinforcement for an expandable or foaming material is disclosed that comprises a first and a second member each having protuberances that are contacted when the first and second members are joined. The members are joined by bending a hinge that separates the members, or can be joined in multiple units to form a series. The members are maintained in a closed or joined position by at least one latch. Once joined, the first and second members define at least one opening wherein a foaming composition can be injected into the joined members. Alternatively, a preformed expandable material can be placed between the first and second members, or located on selected outer positions, e.g., within an automotive cavity to be sealed.

12 Claims, 3 Drawing Sheets

U.S. PATENT DOCUMENTS

| | | |
|---|---|---|
| 5,574,124 A | 11/1996 | Schmalstieg et al. |
| 5,631,027 A | 5/1997 | Takabatake |
| 5,678,826 A | 10/1997 | Miller |
| 5,817,860 A | 10/1998 | Rizk et al. |
| 5,904,024 A | 5/1999 | Miwa |
| 5,917,860 A | 6/1999 | Lee |
| 6,058,673 A | 5/2000 | Wycech |
| 6,361,523 B1 * | 3/2002 | Bierman ................. 604/174 |
| 6,405,864 B1 * | 6/2002 | Streich et al. ............ 206/373 |

* cited by examiner

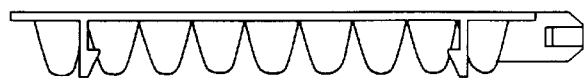
FIG.1c
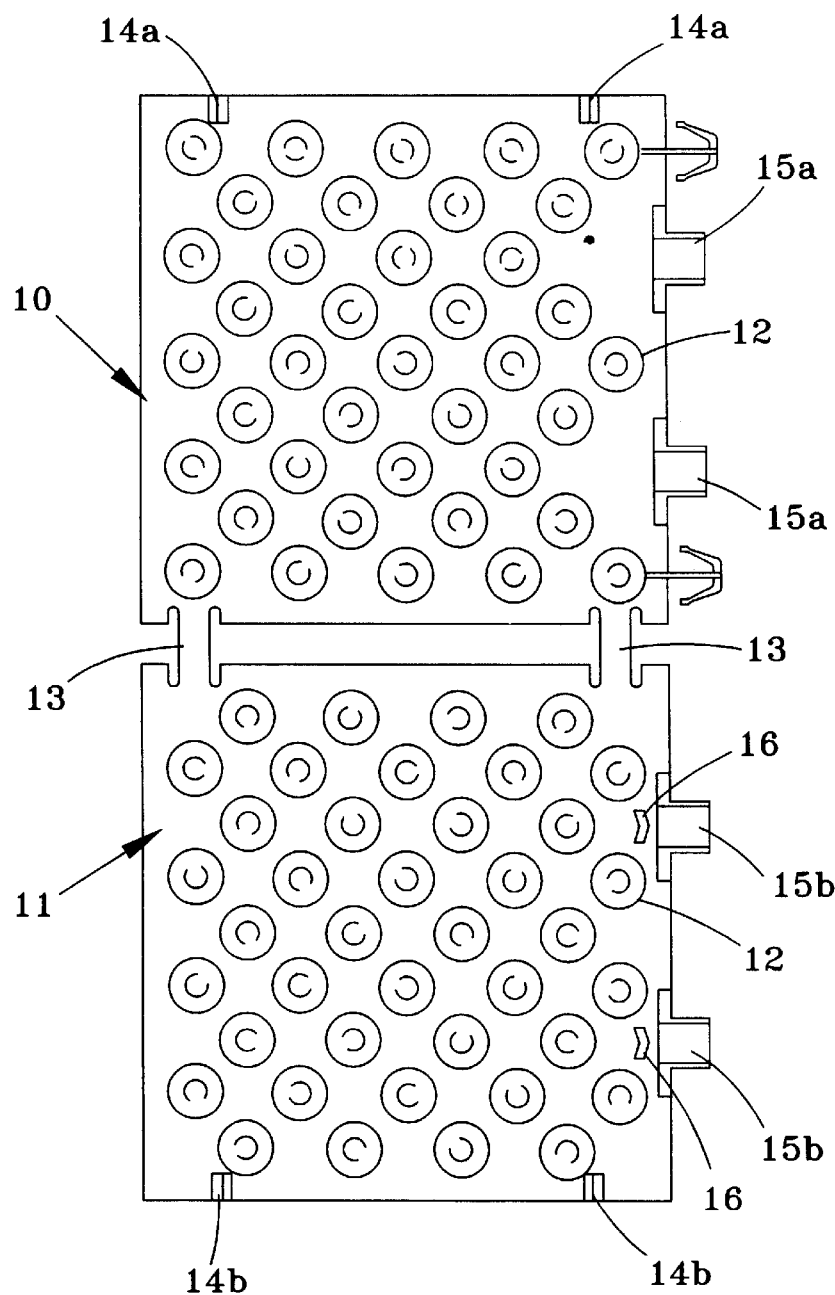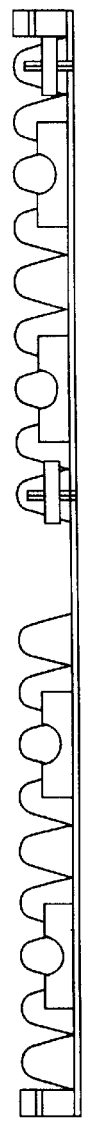
FIG.1a  FIG.1b

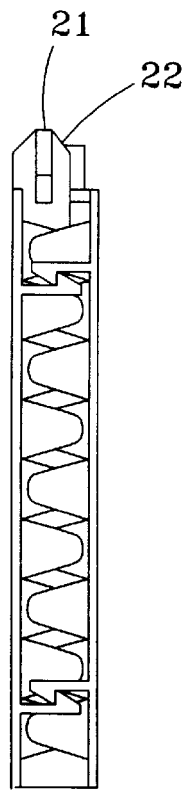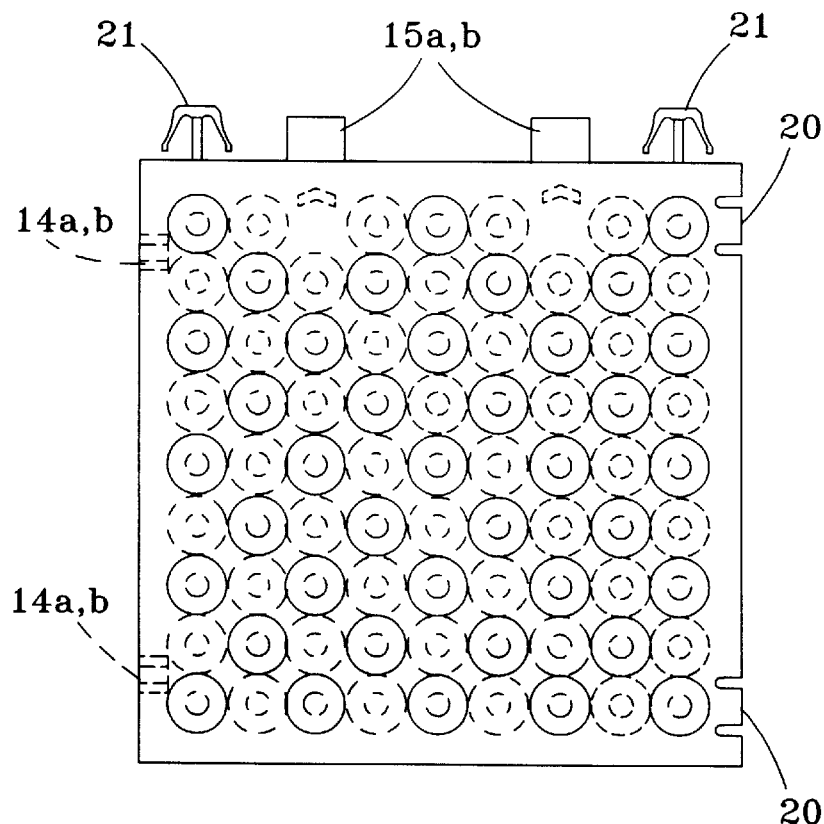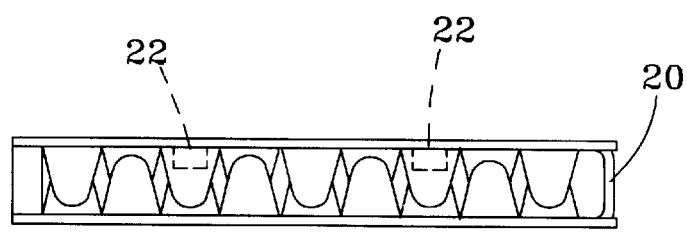
FIG. 2c
FIG. 2a
FIG. 2b

REINFORCEMENT FOR EXPANDABLE COMPOSITIONS AND METHODS FOR USING THE REINFORCEMENT

CROSS REFERENCE TO RELATED PATENT APPLICATION

The subject matter disclosed herein is related to copending and commonly assigned U.S. patent application Ser. No. 09/696,854, filed on Oct. 26, 2000 in the name of Duffin et al., that corresponds to PCT/US00/29615; the entire disclosure of which is hereby incorporated by reference.

The subject matter herein claims benefit under 35 U.S.C. 119(e) of U.S. patent application Ser. No. 60/287,647, filed on Apr. 30, 2001. The disclosure of Ser. No. 60/287,647 is incorporated by reference.

FIELD OF THE INVENTION

The instant invention relates to reinforcement for an expandable composition. The instant invention also relates to a method of using the reinforcement to retain an expandable composition, for example, within an automotive cavity.

BACKGROUND OF THE INVENTION

Expandable sealants are known in this art such as described in U.S. Pat. Nos. 4,427,481; 4,874,650; 5,106,415; 5,266,133; 5,373,027; 5,506,025; 5,266,133; 5,373,027; and 5,678,826; and European Patent No. EP 0 730 998B1; the disclosure of each of which is hereby incorporated by reference. One conventional cavity sealing arrangement and method is described in U.S. Pat. No. 5,040,803; the disclosure of which is also hereby incorporated by reference. Other convention cavity sealants comprise polyvinyl chloride (PVC), and polyurethane (PU) based materials that are pumped into location and, in some cases, expand after being exposed to a sufficient amount of heat. Conventional sealants also include epoxy containing foams, and combining PU and epoxy foaming systems.

In some cases, the expandable sealant is preformed to have a defined configuration. The preformed sealant can be located within a cavity or an area for sealing and then heated. The heating (e.g., that is used to bake automotive paints), causes the sealant to expand and in turn form a seal. Preformed automotive sealants are available from Orbseal LLC, Richmond, Miss. as Product Numbers 136, 157, 20000, 20100, 21000, 21100, among others. Typically, these sealants are employed in automotive applications for filing cavities, stiffening adjacent components and dampening sound/vibrations. Such sealants are employed to satisfy automotive specifications such as Ford Specification WSS M99P35-A, WSS M99P29-A and WSSM2D494-A; the disclosure of which is incorporated by reference.

Conventional foam compositions are described in U.S. Pat. Nos. 6,058,673; 5,574,124; 4,052,347; 4,355,138; 5,461,091; 4,963,675; 5,356,943; 5,350,777; 4,910,332; 5,817,860; 4,888,442; 4,855,490; 4,864,025; 4,904,522 and 5,461,091, and WIPO Publication Nos. WO 96/06124 and WO 98/52997. Polyurethane foam compositions and compositions having reduced MDI content are described in U.S. Pat. Nos. 5,817,860; 5,574,124; 4,052,347; 4,355,138; 4,888,442; 4,864,025; 4,855,490; 4,963,675; 5,350,777; 4,910,332; 5,356,943, European Patent Application Publication No. 0 393 903 A2 and WIPO Publication No. WO/96/06124. The disclosure of these patents and patent application publications is incorporated by reference.

Expandable and foaming compositions can extend beyond the intended area to be sealed (e.g., foaming compositions are dispensed into a cavity as a stream/froth that may flow into undesired areas). There is a need in this art for an expandable composition that: 1) is reinforced to improve strength and control material flow during expansion, 2) can be adhered or affixed to a metal substrate, 3) is easily installed and remains in a predetermined location, and 4) for some applications provides acoustical or structural properties to the surrounding members, e.g., an automotive cavity.

SUMMARY OF THE INVENTION

The instant invention solves problems associated with conventional expandable materials and foams, and application methods by providing a reinforcement that contacts the expandable material/foam during expansion. In contrast to conventional materials and methods, the instant invention can: 1) provide reinforcement to an expandable material having a predetermined or preformed shape, e.g., extrusion, stamping, and injection molding, 2) be located, e.g., within a cavity, or around or upon a member to be sealed, prior to/post assembly while remaining in a predetermined location, 3) be employed in a wide range of applications, 4) control flow rate and direction of foaming compositions; and 5) provide increased strength/reinforcement after expansion/ foaming. By employing at least one of the inventive reinforcement, at least a portion or substantially all of a predetermined cavity can be filled. When employed in an automotive cavity, the inventive reinforcement permits selective placement of an expandable composition thereby avoiding excessive material usage (and attendant weight gain) and providing improved acoustical/structural properties to adjacent metallic components. If desired, the inventive reinforcement permits a predetermined amount of an expandable material to be located within an automotive cavity for structural reinforcement thereby permitting a reduced gauge of metal to be used without reducing the strength of the cavity or increasing overall weight.

The inventive reinforcement comprises a first and a second member each having protuberances that are contacted when the first and second members are joined. The members are joined by bending a hinge that separates the members, or can be joined in multiple units to form a series. The members are maintained in a closed or joined position by at least one latch. Once joined, the first and second members define at least one opening wherein a foaming composition can be injected into the joined members. Alternatively, a preformed expandable material can be placed between the first and second members, or located on selected outer positions, e.g., within an automotive cavity to be sealed. By selecting the location and number of reinforcement members, all or a portion of a cavity can be filled with an expandable composition. In either case, the foaming/ expanding material embeds the reinforcement. The foam/ expandable material can expand further as the material cures as well as a result of subsequent processing, e.g., during the automotive assembly process.

BRIEF DESCRIPTION OF THE DRAWINGS

FIG. 1A is an overhead view of the inventive reinforcement in an open position.

FIG. 1B is an end view of the reinforcement of FIG. 1A.

FIG. 1C is a second end view taken 90 degrees from FIGS. 1A and 1B of the reinforcement of FIG. 1A.

FIG. 2A is an overhead view of the inventive reinforcement of FIG. 1A in a closed position.

FIG. 2B is an end view of the reinforcement of FIG. 2A.

FIG. 2C is a second end view taken 90 degrees from FIGS. 2A and 2B of the reinforcement of FIG. 2A.

Figure 3A:
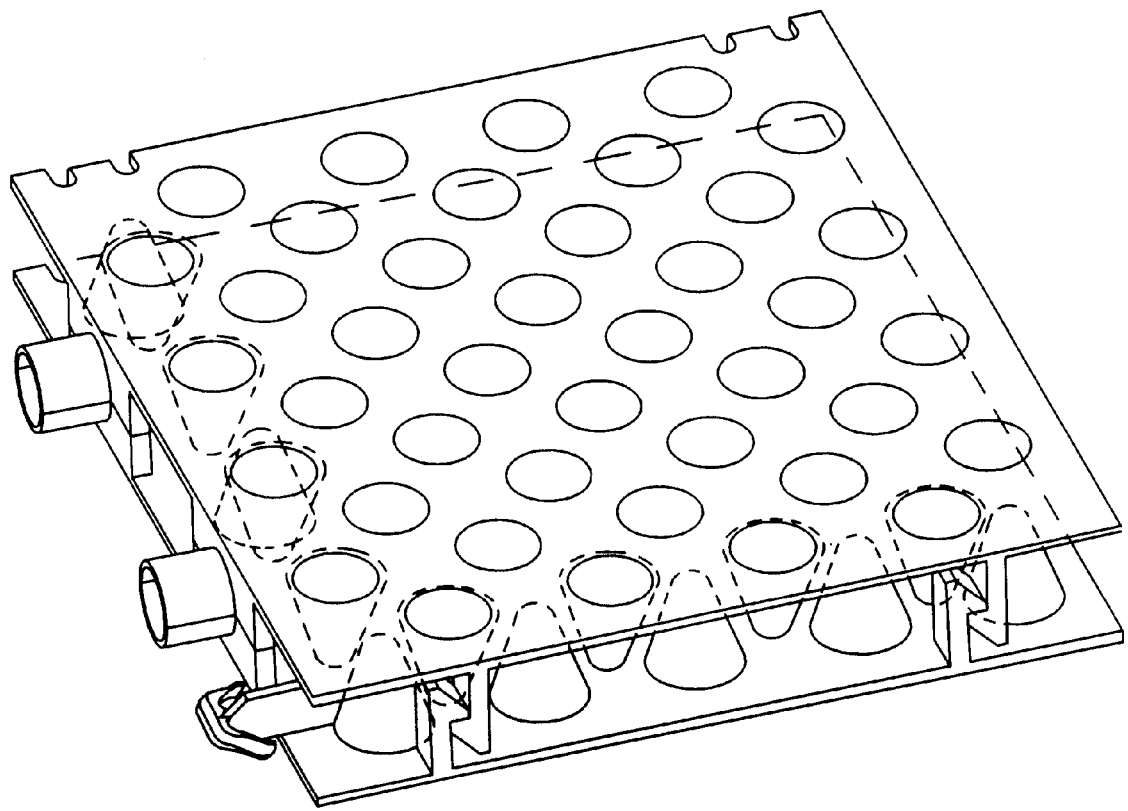
FIG. 3A is a view of the closed inventive reinforcement of FIG. 2 that illustrates a latching mechanism.

Reinforcement can be attached into a multiple series in order to extend the reinforcement length, or to control the area filled and direction into which the composition expands.

DETAILED DESCRIPTION

The inventive reinforcement comprises a first and a second member each having protuberances. The number and location of the protuberances are such that the protuberances are engaged when the first and second members are brought into contact. The protuberances extend outwardly from the surface of the members. The direction in which the respective protuberances extend is the same for both members. The first and second members can have any desirable configuration so long as the configuration permits the members to be engaged, e.g., by bending a hinge that permits protuberances on the first and second members to contact. Examples of suitable configurations for the members comprise flat, curvilinear, round, square, among others. Examples of suitable configurations for the protuberances comprise at least one of conical, frusta-conical, pyramidal, square, cylindrical, among others. The protuberances can be either closed, open ended or combinations thereof. The protuberances can be either evenly or unevenly spaced upon the members.

The first and second members are connected by at least one hinge. The hinge provides a pivot point about which the first and second members can move so that the respective protuberances of the members can become engaged. The hinge can comprise any suitable configuration such as a strip of material, separately attached article, an integral molded component, among others.

The members are maintained into a closed or joined position by at least one latch. The latch can be of any suitable configuration. Examples of suitable configurations comprise a compression or snap fit, hook, flap, among other conventional connecting means. The latch can comprise a separately attached component or an integrally molded with the members.

The first and second members, once the protuberances have engaged, define at least one opening. The opening can be employed as a port for introducing a foaming composition into the reinforcement (e.g., polyurethane foam). The introduced foaming composition embeds the protuberances as it expands through the reinforcement. The expanding foam typically extends beyond the reinforcement and contacts the surrounding cavity or area to be sealed, e.g., an acoustical or structural foam within an automotive cavity. The reinforcement functions to control the flow of the expanding foam within a predetermined area, define the location of the foam and provide improved structural integrity to the foam.

In one aspect of the invention a preformed expandable material can be placed between the first and second members. Typically, the preformed material is heat activated. When the preform is heated, the material expands and embeds the reinforcement in the manner described above in connection with foaming compositions.

In a further aspect, the instant reinforcement comprises at least one fastener that retains the reinforcement at a predetermined location. The fastener can maintain the reinforcement at any suitable predetermined location such as an automotive front and/or rear "A"-pillar, "B"-pillars, "C"-pillar, pillar to rail sections, cross-members, cross-members to rails, roof side rails, sill or rocker panels, among other locations where it is desirable to position an expandable/foaming material adjacent to a member to be sealed. By "adjacent" it is meant term "adjacent" as used in this specification and the claims, unless expressly stated otherwise, means two components that are in contact with each other, are next to each other with a space separating them, or are next to each other with a third component in between. By "member to be sealed" it is meant that the material contacts the member or a cavity at least partially defined by the member either prior to, during or after completing expansion. The member to be sealed can be at least partially embedded or penetrated by the expanding material. The fastener can be attached to or incorporated within the material prior to expansion. While any suitable fastener can be employed, examples of suitable fasteners comprise at least one member selected from the group of blades, pins, push-pins, clips, compression fit fasteners, among other fasteners that are capable for maintaining a shaped expandable composition in a predetermined location without adversely affecting the expansion or performance of the composition. The fasteners can also comprise an integrally molded component of the reinforcement. Specific examples of suitable fasteners are described in aforementioned U.S. Pat. Nos. 5,040,803 and 5,678,826.

The inventive reinforcement can be fabricated from any suitable material. Examples of suitable materials comprise at least one member comprising polyester, polyamid, mineral/reinforced filled polymers, among others that are heat stabilized and retain high strength during function and life of the area to be sealed. The inventive reinforcement can be produced by using any suitable method such as injection molding, extrusion, pultrusion, stamping, among other conventional methods for shaping thermoplastic compounds. The inventive reinforcement should be resistant to the temperatures associated with exposure to the expanding compositions (e.g., heat stable to 400 F).

The expanding composition either preformed or injected into the reinforcement can comprise any suitable composition. Example of suitable compositions comprise polyurethane, low MDI polyurethanes, among other compositions identified in the previously referenced patent, patent applications and publications. When employed in an automotive application, the foam will typically be adherent to oily or e-coated metals. The foam will also typically have an expansion of at least 200% to about 1,000%.

Certain aspects of the invention are better understood when referring to the Drawings. Referring now to the Drawings, FIGS. 1A–1C illustrate one aspect of the inventive reinforcement wherein the first and second members 10 and 11 are in an open position. First and second members included spaced apart and outwardly extending protuberances 12. First and second members are connected via two hinge members 13. First and second members include latching components 14A and 14B, and components 15A and 15B that when joined define two openings through which a foaming composition (e.g., polyurethane foam) can be introduced into the reinforcement (when a heat activated preform expandable material is employed components 15A and 15B can be omitted or used in conjunction with another foaming composition such as PU foam). As the foam is introduced into the reinforcement via the two openings, the foam is directed throughout the reinforcement by contacting deflectors 16.

Referring now to FIGS. 2A–2C, these Drawings illustrate the inventive reinforcement of FIGS. 1A–1C in a closed position. FIGS. 2A–2C illustrate that first and second members 10 and 11 pivot about hinge 13 to achieve the closed position. Hinge 13 is shown in its deformed or bent position 20. The reinforcement is maintained at a defined position within a cavity or an area to be sealed by fasteners 21. When in the closed position, the space between the protuberance on one member is filled by the protuberance on the other member. Opening 22 is defined when members 15A and B are contacted. The first and second members are maintained in a closed position by latch 14A and 14B.

Figure 3B:
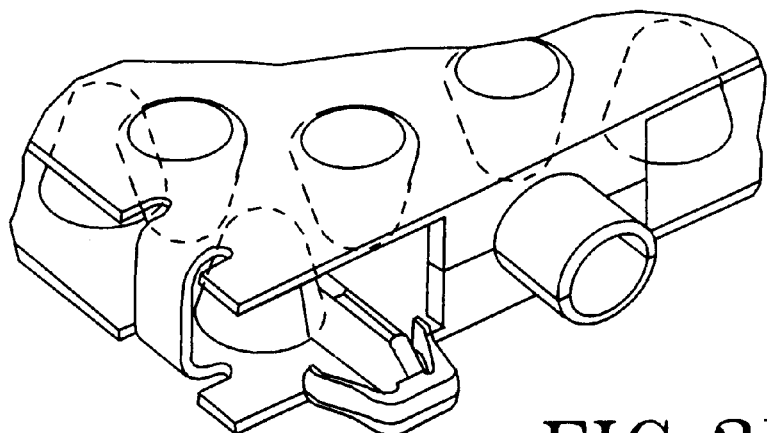
FIG. 3B is a view of the closed inventive reinforcement of FIG. 2 that illustrates a hinge mechanism.

Referring now to FIGS. 3A and 3B, FIG. 3A illustrates in greater detail the interconnection of latch 14A and 14B in a closed position. FIG. 3B illustrates in greater detail how hinge 13 (FIGS. 1A–1C) is bent into its configuration designated as 20 (FIGS. 2A–2C). FIGS. 3A and 3B also show opening 22 and fastener 21.

While the above Description emphasizes expandable compositions for use in automotive applications, the inventive reinforcement can be employed with expandable compositions (e.g., PU) in a virtually unlimited array of applications. Examples of such applications can include one or more of sealants for aircraft, golf cars, agricultural equipment, marine vessels, an insulating member, a residential or industrial sealant, among other applications. The inventive reinforcement can be employed with expandable/foaming composition that are extruded, pumped into a desired location, sprayed, preformed (e.g., injection molded), among other methods for using sealants.

The following is claimed:

1. A reinforcement comprising a first and a second member each comprising a plurality of protuberances wherein the protuberances define at least one opening, at least one hinge between said first and second members and a latch for maintaining the first and second members in a closed position and wherein aid first and second members define an opening when said first and second members are in the closed position.

2. A reinforcement for receiving a foaming composition within an automotive cavity comprising: a first and a second member each comprising a plurality of protuberances, at least one hinge between aid first and second members that allows the first member to engage the second member in a closed position and at least one fastener for maintaining said reinforcement at a predetermined location within said cavity and wherein said first and second members define an opening for receiving the foaming composition when said first and second members are in the closed position.

3. The reinforcement of claim 2 wherein the cavity comprises at least one member selected from the group consisting of an A-pillar, B-pillar, C-pillar, cross-members, roof side rails and rocker panels.

4. The reinforcement of claim 2 wherein said foaming composition comprises polyurethane foam.

5. The reinforcement of claim 2 wherein said reinforcement comprises at least one injection molded thermoplastic.

6. The reinforcement of claim 2 further comprising at least one deflector for directing the foaming composition through the reinforcement.

7. The reinforcement of claim 2 wherein in said protuberances define at least one opening.

8. A method for improving the acoustical properties of an automotive cavity comprising:
   introducing at least one reinforcement into the cavity wherein said reinforcement comprises a first and a second member each comprising a plurality of protuberances, at least one hinge between said first and second members and wherein said first and second members define at least no opening for receiving at least one expandable or foaming composition when said first and second members are in a closed position; and,
   contacting said at least one reinforcement with at least one expandable or foaming composition,
   embedding at least a portion of said reinforcement within said at least one expandable or foaming composition.

9. The method of claim 8 wherein said foaming composition comprising polyurethane foam.

10. The method of claim 8 further comprising affixing said reinforcement member at a predetermined location within said cavity.

11. The method of claim 8 herein said at least one reinforcement further comprises at least one hinge between said first and second members that allows the first member to engage the second member in the closed position, and at least one fastener for maintaining said reinforcement at a predetermined location within said cavity.

12. A reinforcement comprising a first and a second member each comprising a plurality of protuberances defining at least one opening, at least one hinge between said first and second members that allows the first member to engage the second member in a closed position and at least one fastener for maintaining said reinforcement at a predetermined location within said cavity and wherein said first and second members define an opening when said first and second members are in the closed position.

* * * * *